United States Patent
Cui et al.

(10) Patent No.: US 10,244,445 B2
(45) Date of Patent: Mar. 26, 2019

(54) SDN BASED CONNECTIONLESS ARCHITECTURE WITH DUAL CONNECTIVITY AND CARRIER AGGREGATION

(71) Applicant: AT&T Intellectual Property I, L.P., Atlanta, GA (US)

(72) Inventors: Zhi Cui, Sugar Hill, GA (US); Jiansong Wang, Parlin, NJ (US); Thomas Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/462,271

(22) Filed: Mar. 17, 2017

(65) Prior Publication Data
US 2018/0270721 A1    Sep. 20, 2018

(51) Int. Cl.
*H04W 36/08* (2009.01)
*H04W 8/22* (2009.01)
(Continued)

(52) U.S. Cl.
CPC .............. *H04W 36/08* (2013.01); *H04L 41/12* (2013.01); *H04W 8/22* (2013.01);
(Continued)

(58) Field of Classification Search
CPC ... H04W 36/08; H04W 8/22; H04W 36/0011; H04W 72/0486; H04W 88/10; H04L 41/12
See application file for complete search history.

(56) References Cited

U.S. PATENT DOCUMENTS

| | | |
|---|---|---|
| 8,116,735 B2 | 2/2012 | Liu et al. |
| 8,145,211 B2 | 3/2012 | Fouquet |
| (Continued) | | |

FOREIGN PATENT DOCUMENTS

| | | |
|---|---|---|
| WO | WO 1997/042783 A2 | 11/1997 |
| WO | WO 1999/062282 A1 | 12/1999 |
| WO | WO 2016/073935 A1 | 5/2016 |

OTHER PUBLICATIONS

"Specification of Requirements for Security and Confidentiality of System (D8.1)"; European 7th Framework Programme FP7-218086-Collaborative Project; © 2009-2012; 110 pages.
(Continued)

*Primary Examiner* — Duc C Ho
(74) *Attorney, Agent, or Firm* — Baker & Hostetler LLP

(57) ABSTRACT

A wireless network for mobile communications has a connectionless framework using native internet protocol (IP). In this connectionless framework, packet routing may be based on user endpoint (UE) physical IP address, which is associated with the prefix of an associated access node (e.g. eNB). In addition to using the connectionless-IP framework for the traffic flow carried by one access point (e.g. eNB) at a time, advanced mobile call processing features, such as carrier aggregation and dual connectivity, are enhanced to leverage the packet-oriented connectionless radio access network and wireless core network architecture by using the SDN architecture and a wireless network specific software-defined network controller.

20 Claims, 10 Drawing Sheets

(51) Int. Cl.
  *H04L 12/24* (2006.01)
  *H04W 72/04* (2009.01)
  *H04W 36/00* (2009.01)
  *H04W 88/10* (2009.01)

(52) U.S. Cl.
  CPC .... *H04W 36/0011* (2013.01); *H04W 72/0486* (2013.01); *H04W 88/10* (2013.01)

(56) References Cited

U.S. PATENT DOCUMENTS

| | | | |
|---|---|---|---|
| 8,464,315 | B2 | 6/2013 | Ahtisaari |
| 8,666,366 | B2 | 3/2014 | Deatley |
| 8,954,067 | B2 | 2/2015 | Madsen |
| 9,183,520 | B2 | 11/2015 | Davis et al. |
| 9,235,856 | B2 | 1/2016 | Parker |
| 9,451,098 | B2 | 9/2016 | Zhu et al. |
| 9,473,647 | B2 | 10/2016 | Davis et al. |
| 9,491,683 | B2 | 11/2016 | Hu et al. |
| 2006/0007877 | A1* | 1/2006 | Vaittinen ............. H04W 76/064 370/328 |
| 2009/0287589 | A1 | 11/2009 | Fivel |
| 2012/0108296 | A1 | 5/2012 | Coppinger |
| 2013/0083661 | A1* | 4/2013 | Gupta ............... H04W 28/0215 370/235 |
| 2013/0137460 | A1 | 5/2013 | Bodog et al. |
| 2015/0055623 | A1* | 2/2015 | Li ......................... H04W 40/04 370/331 |
| 2015/0109967 | A1 | 4/2015 | Hogan et al. |
| 2015/0124622 | A1 | 5/2015 | Kovvali et al. |
| 2015/0149656 | A1 | 5/2015 | McMurry et al. |
| 2016/0088465 | A1 | 3/2016 | Golla |
| 2016/0127886 | A1 | 5/2016 | Hu et al. |
| 2016/0227471 | A1 | 8/2016 | De Foy et al. |
| 2016/0309379 | A1* | 10/2016 | Pelletier ............. H04W 76/022 |
| 2017/0118677 | A1* | 4/2017 | Axelsson ............. H04W 28/08 |
| 2017/0303169 | A1* | 10/2017 | Hampel ............ H04W 36/0016 |
| 2017/0303189 | A1* | 10/2017 | Hampel ............. H04W 48/20 |
| 2017/0325123 | A1* | 11/2017 | Tabet .................. H04W 28/04 |

OTHER PUBLICATIONS

Kamraan, Nasim; "AETOS: An Architecture for Offloading Core LTE Traffic Using Software Define Networking Concepts"; University of Ottawa; Thesis; 2016; 88 pages.

Taleb et al.; "Follow Me Cloud: Interworking Federated Clouds and Distributed Mobile Networks"; IEEE Network; 2013; p. 12-19.

Kubi et al.; "Evaluation of Some Tools for Extracting e-Evidence from Mobile Devices"; IEEE 5$^{th}$ Int'l Conf. Application of Information and Communication Technologies; 2011; 6 pages.

* cited by examiner

| Network Entity | Prefix | RAT Type | Cell-type | Airline Load | Backhaul Load |
|---|---|---|---|---|---|
| Cell 182 | 1.1 | LTE | Metro | L | L |
| Cell 186 | 1.2 | LTE | Macro | H | M |
| AP 184 | 3.0 | WiFi | | L | H |
| Cell 185 | - | LTE | Macro | - | - |

FIG. 2

| UE 408 | Location 410 | Active Address 1 412 | Active Address 2 414 | Address 1 416 | Address 2 418 | Address 3 420 | Mobility Status 422 | Session IP 424 |
|---|---|---|---|---|---|---|---|---|
| 176 | (x, y) | 1.1.0.1 | | | | | Stationary (S) | 10.10.0.1 |
| 178 | (x, y) | 1.1.0.2 | 3.0.0.2 | 1.1.0.2 | 1.2.0.2 | 3.0.0.2 | Mobile (M) | 10.10.0.2 |
| 180 | (x, y) | 1.1.0.3 | | 1.1.0.3 | 1.2.0.3 | 3.0.0.3 | M | 10.10.0.3 |

494 ↗ 432, 434, 436

| UE 409 | Location 411 | Active Address 1 413 | Active Address 2 415 | Address 1 417 | Address 2 419 | Address 3 421 | Mobility Status 423 | Session IP 425 |
|---|---|---|---|---|---|---|---|---|
| 176 | (x, y) | 1.1.0.1 | | | | | S | 10.10.0.1 |
| 178 | (x, y) | 1.1.0.2 | 3.0.0.2 | 1.1.0.2 | 1.2.0.2 | 3.0.0.2 | M | 10.10.0.2 |
| 180 | (x, y) | 1.2.0.3 | | 1.1.0.3 | 1.2.0.3 | 3.0.0.3 | M | 10.10.0.3 |

| UE | IMSI | UE Session IP | Active Address 1 (P-Cell) | Active Address 2 (S-Cell) | Mobility Status | DC | Inter-site CA |
|---|---|---|---|---|---|---|---|
| 176 | 1xyz176 | 10.10.0.1 | 1.1.0.1 |  | Stationary (S) | Capable | Not Capable |
| 178 | 1xyz178 | 10.10.0.2 | 1.1.0.2 | 3.0.0.2 | Mobile (M) | Active | Capable |
| 180 | 1xyz180 | 10.10.0.3 | 1.1.0.3 |  | M | Capable | Active |

FIG. 7

SDN BASED CONNECTIONLESS ARCHITECTURE WITH DUAL CONNECTIVITY AND CARRIER AGGREGATION

TECHNICAL FIELD

The present disclosure relates to a method and apparatus for session management in a wireless network, e.g., a wireless communications network of a network service provider.

BACKGROUND

As Internet of Things (IoT) devices, smart phones, etc., continue to grow in popularity, the bandwidth and processing demands on wireless networks (e.g., cellular networks) will continue to grow as well. Furthermore, current session management procedures for cellular networks involve complex connection-oriented control procedures that may negatively affect the use of these IoT devices. Traditional cellular architecture use gateway General Packet Radio Service (GGSN) or Packet Data Network Gateway (P-GW) as a mobility anchor and perform service edge (SE) functions, for instance, traffic shaping, lawful interception, charging, etc. User packets are delivered to the GGSN/P-GWs through GPRS Tunneling Protocol (GTP) tunnels for the SE treatment then get routed to various packet networks. This connection-oriented mobility architecture incurs significant overhead for setting up, maintaining, and modifying the tunnels, which makes it very challenging for future mobility network which may support billions of devices.

SUMMARY

Disclosed herein is a framework that provides a connectionless framework using native internet protocol (IP). In this connectionless framework, packet routing may be based on user endpoint (UE) physical IP address, which is associated with the prefix of an associated access node (e.g. eNB). In addition to using the connectionless-IP framework for the traffic flow carried by one access point (e.g. eNB) at a time, mechanisms are considered herein regarding the use of advanced mobility features defined to leverage multiple carriers (e.g., cells or access points) to increase throughput or improve coverage under the context of using connectionless framework. For example, features may include carrier aggregation (CA) and dual connectivity (DC), which may be used in Long-Term Evolution (LTE) or 5G.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 2 illustrates the exemplary network table used by a controller for managing network conditions;

FIG. 3 illustrates an exemplary device table pertaining to devices before and after a handover;

FIG. 7 illustrates an exemplary table pertaining to carrier aggregation or dual connectivity in accordance with the present disclosure;

DETAILED DESCRIPTION

Figure 1:
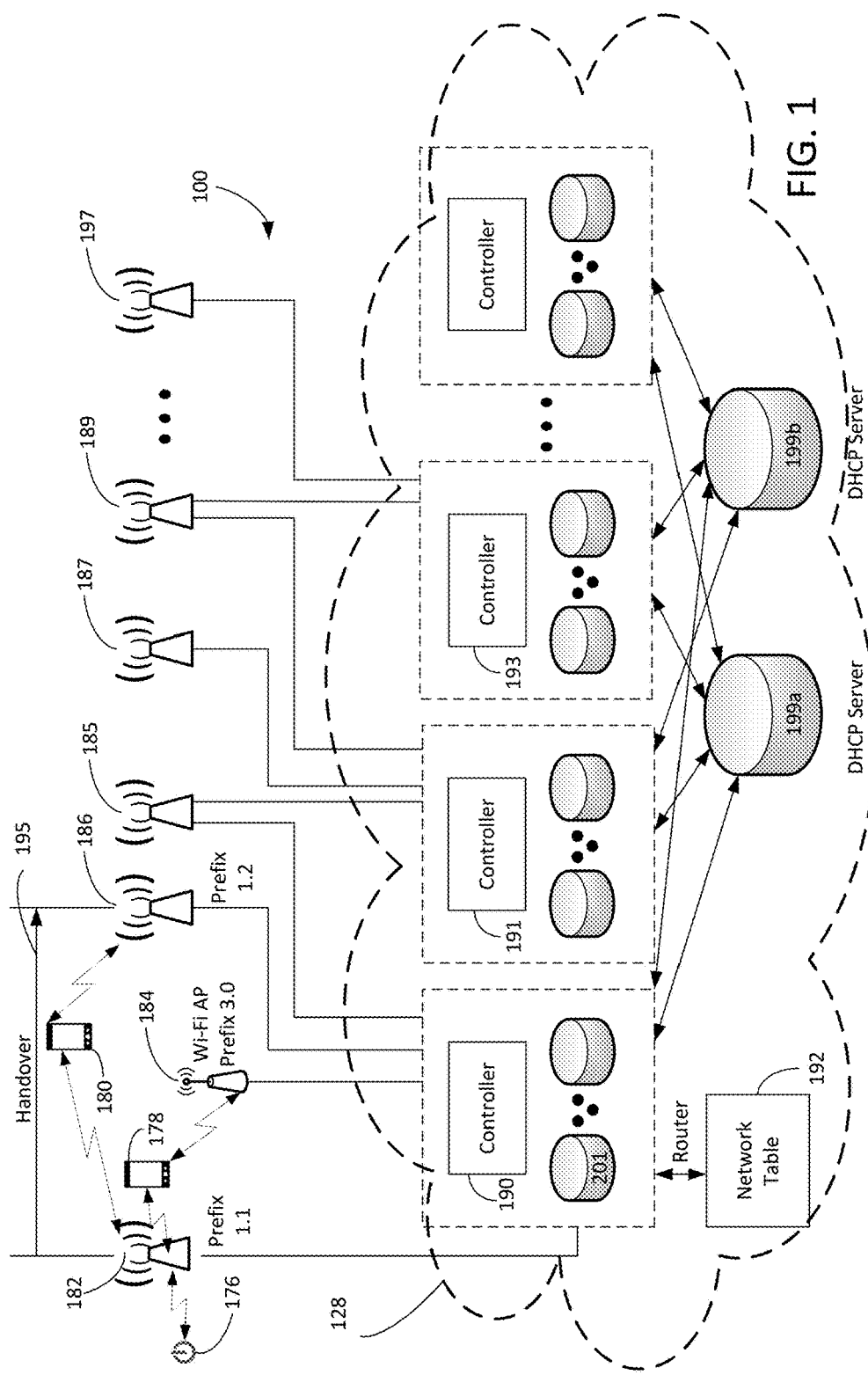
FIG. 1 illustrates an exemplary network related to the present disclosure.

Disclosed herein is a framework that provides a connectionless native internet protocol (IP) based protocol that simplifies wireless network mobility management and session continuity management procedures. In this connectionless framework, packet routing is based on user endpoint (UE) physical IP address (e.g., interface IP address), which is associated with the prefix of an associated access node (e.g. eNB). In addition to using the connectionless-IP framework for the traffic flow carried by one access point (e.g. eNB) at a time, mechanisms are considered herein regarding the use of advanced mobility features defined to leverage multiple carriers (e.g., cells or access points) to increase throughput or improve coverage. For example, features may include carrier aggregation (CA) and dual connectivity (DC), which may be used in Long-Term Evolution (LTE) or 5G. Discussed below are consideration in conventional wireless network mobility, and then the general connectionless-IP architecture, session management in the context of the connectionless-IP architecture, and the use of the disclosed session management to implement features such as CA and DC, among other things.

The present disclosure relates to a method and apparatus for session management in a wireless network, e.g., a wireless communications network of a communications network service provider (broadly a network service provider). The teachings of the present disclosure can be applied via any type of session management protocols defined for various cellular technologies, e.g., Third Generation Partnership Project (3GPP) technologies.

As popularity of Internet of Things (IoT) devices, smart phones, etc., continues to grow, the bandwidth and processing demand on cellular networks due to machine-to-machine (M2M) communication also continue to grow. However, the high demand is not merely due to the increase in the number of user endpoint (UE) devices. There is tremendous growth in the number of services accessed by each UE. For example, in conventional Long Term Evolution (LTE) architecture, one or more bearers may be established to connect a single UE to multiple packet data networks (PDNs), e.g., the Internet, a corporate Intranet network, etc. The bearers may also be simply described as concatenated tunnels, i.e., tunnels that are concatenated for connecting UEs to PDNs. The bearers may also be referred to as packet data protocol (PDP) contexts.

Conventionally, when the UE is activated in LTE, a PDP context or bearer is established to connect the UE to a PDN location and serve the UE as a default PDP context. For example, when the UE is turned on and is successfully authenticated, a first PDP context may be established between the UE and a default PDN gateway (P-GW). Subsequently, other PDP contexts may be activated between the UE and the same or other P-GWs based on the number of services or the types of services that the UE is entitled to access. As such, each UE may establish multiple PDP contexts or PDN connections in wireless networks, e.g., cellular networks.

The multiple PDP contexts are associated with multiple logical connections and multiple session Internet Protocol (IP) addresses. Hence, the conventional session management procedures in a cellular network add significant complexity. For example, a data session connection between a UE and a P-GW within the cellular network involves complex connection oriented control and user plane procedures.

The conventional control plane procedure may be performed via a control plane protocol, e.g., a 3GPP Non-Access Stratum (3GPP NAS) protocol and General Packet Radio Service (GPRS) Tunneling Protocol-Control plane (GTP-C). The 3GPP NAS is used for messages that are exchanged between the UE and the core network nodes. An access stratum is used for communication between the UE and the radio network, i.e., over the wireless portion of the network. For messages that use the 3GPP NAS protocol, they traverse the radio network, transparently, to reach the core network. Example messages that use the 3GPP NAS protocol may include attach messages, authentication messages, service requests, update messages, and the like. Once the UE successfully establishes a radio connection, the UE uses the radio connection to communicate with the network nodes to coordinate a service. For example, the 3GPP NAS protocol may be used for communication between the UE and the core network nodes, such as a Mobile Management Entity (MME), a Serving GPRS Support Node (SGSN), etc.

Similarly, the conventional user plane procedures may be performed via a complex user plane tunneling protocol, e.g., GPRS Tunneling Protocol (GTP)-User plane (GTP-U) or Generic Routing Encapsulation (GRE) tunnel. For example, GTP-U tunnel can be defined for each PDP context and GTP-C tunnel can be defined for all PDP contexts with the same PDP address and access point network (APN). The proliferation of mobile devices has made GPRS Tunneling Protocol (GTP) popular mainly due to its support of mobility features. GTP enables the IP addresses to remain the same and packets to continue to be forwarded to UEs while the UE is physically mobile. The mobility is supported by providing tunneling between the base station and the P-GW, through the serving gateway. The IP address of the UE is encapsulated inside a GTP by the base station. Thus, the IP address of the UE is secure, as it traverses a tunnel between the base station and the serving gateway.

As can be readily seen, the conventional tunnel based approach of the GTP is connection oriented. As the number of IoT devices grows (e.g., millions of devices) connection based communication may be inefficient using the conventional connection-oriented architecture. This is mainly because session management using GTP needs tremendous amount of control plane signaling. In real world scenarios, IoT devices vary on their need for mobility. For example, an IoT device may be a meter reader that occasionally wakes up, takes measurements, reports to a network, and after a period of time returns back to a sleep mode. In another example, an IoT device may be a mobile phone that is constantly communicating with a social network server, a cellular network service provider, etc. In yet another example, an IoT device may be a computer located at a specific physical location, always communicating through a specific access network. For devices where mobility is not a main factor, the connection oriented approach is inefficient in terms of using network resources. For example, for the meter reader described above, a connection oriented approach that maintains a tunnel is unnecessarily overloading the network with control plane messages. Thus, interfaces between radio technologies may be complex and cumbersome (e.g., interfaces using tunneling protocols such as Layer 2 Tunneling Protocol—L2TP, User Datagram Protocol—UDP, General Packet Radio Service, GPRS, Tunneling Protocol—GTP, etc.).

Below is subject matter for a wireless network with a connectionless architecture that may use a native IP based protocol.

FIG. 1 illustrates an exemplary network 100 associated with a connectionless architecture. Network 100 includes UE 176, UE 178, and UE 180 and a core communications network 128. UE 176, UE 178, or UE 180 may include any appropriate type of user equipment, such a mobile phone, a computing tablet, a sensor (e.g., a camera, a meter, a motion sensor, a speed sensor, a temperature sensor, a chemical sensor, a flow sensor, a gas sensor, or the like). It is contemplated herein that various types of sensors (broadly automotive, acoustic, chemical, optical, navigational, proximity, or presence sensors) may be configured with the necessary communication interfaces to interact with various types of access networks. Some UEs may be generally mobile while others may be generally stationary. For example, a water meter may be stationary, a camera may be mobile (e.g., stadium or aerial coverage camera) or stationary (e.g., traffic camera), smart phones may be mobile, etc. The UE may be a device that communicates via a machine-to-machine (M2M) communications interface or may be a device to be used via a human-machine interface. For example, UE 178 may be a smart phone to be used by a human for communication (e.g., voice call or text) or a meter that collects data via sensors and reports to a server via an M2M interface. It is to be understood that the UEs depicted in FIG. 1 are only examples and not intended to be limiting.

With continued reference to FIG. 1, there may be access network entity 182, access network entity 184, access network entity 186, access network entity 185, access network entity 187, access network entity 189, access network entity 197, controller 190, controller 191, controller 193, Dynamic Host Configuration Protocol (DHCP) server 199a, and DHCP server 199b. The core network 128 may include the controllers (e.g., controller 190), routers, switches, DHCP servers (e.g., DHCP server 199a), or the like. Controllers 190, controller 191, controller 193 may be communicatively coupled with DHCP servers 199a or 199b that may be assist with providing information for session management.

A controller (e.g., controller 190), as described herein, may include any appropriate controller, such as an SDN based controller. Access network entity 182, access network entity 184, access network entity 186, or access network entity 185 may be associated with (e.g., controlled by) controller 190. Access network entity 185, access network entity 187, or access network entity 189 may be associated with controller 191. Access network entity 189 and access network entity 197 may be associated with controller 193. Access network entity 182, access network entity 184, access network entity 186, access network entity 185, access network entity 187, access network entity 189, or access network entity 197 may include various types of access network entities. For example, access network entity 182 may include a metro cell, access network entity 186 may include a macro cell, or access network entity 184 may include a Wi-Fi access point. For simplicity in the example discussed herein, access network entity 182 may simply be referred to as cell 182, access network entity 186 may simply be referred to as cell 186, and access network entity 184 may simply be referred to as Wi-Fi AP 184.

The controllers (e.g., controller 190) may manage network conditions or device conditions. In order to manage network conditions, the controller may gather appropriate information pertaining to network 100. For example, controller 190 may gather and maintain information via a network table 192 (more details shown in FIG. 2). The other controllers may also have respective network tables. FIG. 1 shows only a single network table 192 for controller 190 for clarity.

With continued reference to FIG. 1, an example configuration, controller 190 may be tasked with determining network condition information for cell 182, cell 186, or Wi-Fi AP 184. In turn, cell 182, cell 186, or Wi-Fi AP 184 may be communicatively coupled with controller 190, as shown. For example, UE 176 may be communicatively coupled with cell 182 and have packets of information to send to cell 182. UE 178 may be communicatively coupled with cell 182 and Wi-Fi AP 184. UE 178 may be executing voice and video applications. UE 178 may not be moving at a first point in time, and may desire multi-path connectivity for one or more sessions in the future. UE 180 may be communicatively coupled with cell 182 and cell 186. UE 180 may be moving in the direction illustrated by arrow 195, e.g., on a road. That is, UE 180 may be moving away from cell 182 and toward cell 186. UE 180 may be in the process of being handed over from one access network entity (e.g., cell 182) to another access network entity (e.g., cell 186) via the mobility management procedure of the present disclosure.

UE 176 may include a meter reader or the like, UE 178 may include a smart phone or the like, and UE 180 may include a smart device (e.g., a tablet, phablet, etc.) or the like. UE may be a device moving in the direction of arrow 195, physically getting further away from cell 182 and getting closer to cell 186. When a handover occurs, a controller (e.g., controller 190) may provide instructions to router 201 to update packets directed to the smart UE 180 via the new cell serving device (e.g., cell 186). It is contemplated herein that router 201 is a network device that may be router or switch (e.g., OpenFlow® switch).

FIG. 2 illustrates an exemplary network table 192 used by a controller (e.g., controller 190) for managing network conditions in a connectionless architecture for wireless network mobility management. Table 192 may be stored in a database associated with controller 190. Network table 192 may include an Automatic Neighbor Relation (ANR) table. Network table 192 may include information about each access network entity (e.g., each cell, access point, or other base station) that is managed by the controller 190. Column 306 of table 192 provides a list of access network entities, such as cell 182 (at row 326), cell 186 (at row 328), Wi-Fi AP 184 (at row 330), and cell 185 (at row 331). Conventionally the ANR is eNB function and resides on the eNB. It is responsible for creating/updating/deleting of relations with neighbor cells as shown in FIG. 2. FIG. 2 includes an enhanced version of ANR, which includes other types of radio access points, e.g. Wi-Fi.

To effectuate wireless network mobility management, one or more IP addresses may be assigned to a device or an access network entity. In an example configuration, controller 190 may determine an IP address for each UE and access network entity within the purview of controller 190. For example, table 192 shows (in column 308 and row 326) that the prefix for an IP address associated with cell 182 is 1.1. Similarly, table 192 shows (in column 308, and row 328) that the prefix for an IP address associated with cell 186 is 1.2. Similarly, table 192 shows (in column 308 and row 330) that the prefix for the Wi-Fi AP 184 is 3.0. Note that cell 185 is not involved in the handover of UE 180 from cell 182 to cell 186. Thus, for the sake of simplicity, no prefix is shown for cell 185 in table 192. However, any appropriate prefix may be assigned to cell 185, as described herein.

As shown in table 192, the type of radio access technology for each access network entity may be provided. For example, column 310, row 326 indicates that cell 182 is an LTE cell. Column 310, row 328 indicates that cell 186 is an LTE cell. Column 310, row 330 indicates that access point 184 is a Wi-Fi access point. Column 310, row 331 indicates that cell 185 is an LTE cell. As shown in table 192, column 312, the cell type for each cell may also be listed. For example, column 312, row 326 indicates that cell 182 is a metro cell, column 312, row 328, indicates that cell 186 is a macro cell, and column 312, row 331 indicates that cell 185 is a macro cell. Other examples of cell types may include femto cell, pico cell, umbrella cell, or the like.

The load for a cell may also be included in the network table. For example, as depicted in table 192, air link load and backhaul load may be listed as shown in columns 314 and 316, respectively. As depicted in table 192, column 314, row 326, the air link load for cell 182 is low (L) (e.g., approximately 30% loaded). As depicted in table 192, column 316, row 326, the backhaul load for cell 182 is low (L) (e.g., approximately 30% loaded). As depicted in table 192, column 314, row 328, the air link load for cell 186 is high (H) (e.g., approximately 80% loaded). As depicted in table 192, column 316, row 328, the backhaul load for cell 186 is medium (M) (e.g., approximately 65% loaded). As depicted in table 192, column 314, row 330, the air link load for access point 184 is low (L) (e.g., approximately 30% loaded). As depicted in table 192, column 316, row 330, the backhaul load for access point 184 is high (H) (e.g., approximately 80% loaded). Controller 190 may determine load in any appropriate manner. For example, an LTE eNodeB may monitor and report the utilization of data and control channels to a mobility controller according to the percentage of times the data and control channels are idle or available over a specified time interval.

Controller 190 may gather network conditions and store information needed for managing the network. Similarly, the controller may generate, update, or maintain information pertaining to devices, e.g., UE 176.

Below is subject matter for a wireless network with a connectionless architecture with further details regarding session layer IP address. The method of the present disclosure provides multiple types of addresses to the UE: a first type may be for one or more interface IP addresses and a second type may be for one or more session layer IP addresses.

Generally, an interface IP address of a UE 175 may include an Internet Protocol address, e.g., an IP Version 6 (IPv6) address that is assigned to the UE 175 when the UE attaches to an access network entity of a wireless network, e.g., a cell site (cell) of a cellular network, an Access Point (AP) of a Wi-Fi network, and the like.

In one example, the interface IP address is formed as a combination of a physical address of the UE (described below) and a physical interface address prefix (or broadly a site prefix). The site prefix is obtained from the respective cell or access point. Each cellular site, Wireless Fidelity (Wi-Fi) Access Point (Wi-Fi AP), 5G Radio Access Network (RAN) access point, or the like, may have a physical interface address prefix that is broadcast over the air. The UE may then be able to acquire the site prefixes of any number of access network entities that serve the geographical area at which the UE is located.

The physical address of the UE may also be referred to as the burned in physical address. The physical address of the UE may include an address assigned by a service provider of the wireless network. For example, the wireless service provider may provide to the UE a private network address that may not be globally reachable.

The interface IP address of the UE is globally unique when the UE is attached to a wireless network. For example, no two UEs may have the same interface IP address while they are attached to a cell or access point. The interface IP address may be used by a controller for managing mobility of the UE. The controller may include a Software Defined Network (SDN) controller.

The UE may have multiple interface IP addresses. For example, the UE may be attached to multiple access networks via multiple access network entities, with each access network entity being used to attach to a respective access network of the multiple access networks. Each interface IP address may be formed by combining the physical address of the UE with a site prefix of an access network entity (e.g., a cell or AP). For example, if one Wi-Fi AP prefix and one cell site prefix are detected by a UE, the UE may learn two interface IP addresses: a first interface IP address that is formed as a combination of the physical address of the UE with the Wi-Fi AP prefix, and a second interface IP address that is formed as a combination of the physical address of the UE with the cell site prefix.

In one example, a session layer IP address includes a service IP address of a device's application layer. The session layer IP address may also be referred to as an application session layer IP address, or an application layer address. The UE may have a need for multiple applications. Hence, the UE may have multiple session layer IP addresses to satisfy various requirements, e.g., quality of service, associated with the multiple applications.

FIG. 3 depicts example device tables 494 and 499 pertaining to devices before and after a handover. Device table 494 of FIG. 3 depicts device information pertaining to devices associated with the controller 190 prior to the handover of UE 180 from cell 182 to cell 186. Device table 499 of FIG. 3 depicts device information pertaining to devices associated with controller 190 after the handover of UE 180 from cell 182 to cell 186. The device table may include information about each device coupled with or in communication with (associated with) a cell, access point, or the like that is coupled with or controlled by a controller. Thus, as devices move in and out of communication range with an access network entity associated with controller 190, information in a device table may be updated.

As depicted in device table 494 and table 499, devices (e.g., UEs) are listed in columns 408 and 409, respectively. The UEs may be listed in any appropriate manner. For example, columns 408 and 409 may include identifiers that respectively identify each UE associated with controller 190. Identifiers may include any appropriate identifier, such as, for example, a phone number, a device ID, a serial number, an International Mobile Subscriber Identity ("IMSI") number, a random number, a quasi-random number, a number from a sequence of numbers, a number determined by controller 190, or the like, or any appropriate combination thereof.

As shown in device table 494, UE 176 is identified at a cell located at column 408 and row 432 (i.e., (408,432)). For the sake of clarity, cell locations are identified herein by parenthetically bound column number and row number. For example, UE 176 is identified at cell (408,432), UE 178 is identified at cell (408,434), and UE 180 is identified at cell (408,436).

In addition, device tables (e.g., UE tables) may include profile information. Profile information may include information pertaining to a UE or an entity (e.g., person) associated with a UE. Profile information may include any appropriate information describing an aspect, characteristic, preference, membership, subscription, etc. of a UE or an entity associated with the UE. For the sake of simplicity, specific profile information is not depicted in table 494 or table 499.

UE tables (or referenced as device tables herein) may also include application information. Application information may include information pertaining to an application, or applications, executing or to be executed on a UE. Example applications may include sensor applications (for communicating sensor information, i.e., measured information by sensors), voice applications, video applications, data transfer applications, Internet access applications, or the like. For the sake of simplicity, specific application information is not depicted in table 494 or table 499.

Device tables may also include various addresses for devices (e.g., UEs), cells, access points, etc. In example configurations, controller 190 may determine an address, or addresses, for a device and an associated access network entity based on the prefix of the access network entity (entities) (e.g., the cells or APs) to which the device is coupled, other addresses in use (currently assigned), handover information, location, or the like. In an example configuration, an address may include a prefix that identifies an access network entity and a suffix that identifies a device. Prefixes and suffixes may be any appropriate size, or length, such as, for example, 16 bits, 32 bits, 64 bits, 128 bits, or the like. Any appropriate addressing protocol may be utilized, such as an Internet Protocol, (e.g., Internet Protocol Version 6 (IPv6), Internet Protocol Version 4 (IPv4), etc.), or the like.

As shown in FIG. 2, the prefix for cell 182 is 1.1. As shown in device table 494 and table 499 of FIG. 3, the address suffix for UE 176 is 0.1 (412, 432; and 413, 433), the address suffix for UE 178 is 0.2 (412, 434; and 413, 435), and the address suffix for UE 180 is 0.3 (412, 436; and 413, 437). Note that the prefix the IP address shown for the cell or access point in column 308 of table 192 is combined with the address suffix of the device (e.g., 0.1 for UE 176, 0.2 for UE 178, and 0.3 for UE 180) to obtain the various addresses shown in columns 412-421 of tables 494 or 499.

It is to be understood that the addresses illustrated herein are examples and not to be limited thereto. For example, an address suffix may include a host address of a device. In an example configuration, a controller may generate an address prefix and append the address prefix to a device host address to generate an address.

Controller 190 may also maintain information regarding a location of a UE. Column 410 of device table 494 and column 411 of device table 499 indicate location information. For example, the location of UE 176 prior to the handover of UE 180 from cell 182 to cell 186 may be depicted at column 410, row 432 of device table 494. The location of UE 178 prior to the handover of UE 180 from cell 182 to cell 186 may be depicted at column 410, row 434 of device table 494. The location of UE 180 prior to the handover of UE 180 from cell 182 to cell 186 may be depicted at column 410, row 436 of device table 494. The location of UE 176 after handover of UE 180 from cell 182 to cell 186 may be depicted at column 411, row 433 of device table 499. The location of UE 178 after the handover of UE 180 from cell 182 to cell 186 may be depicted at column 411, row 435 of device table 499. The location of UE 180 after the handover of UE 180 from cell 182 to cell 186 may be depicted at column 411, row 437 of device table 499. Specific location information is not shown in table 494 or table 499 for the sake of simplicity.

Controller 190 may maintain (e.g., in device table 494 and device table 499) an indication as to which addresses are active (in use) regarding a device and a cell/access point (an access network entity). As shown in columns 412 and 414 of device table 494, prior to the handover of UE 180 from cell 182 to cell 186, UE 176 may be active via cell 182 (412, 432), UE 178 may be active via cell 182 (412, 434) and via access point 184 (414, 434), and UE 180 may be active via cell 182 (412, 436). As shown in columns 413 and 415 of device table 499, after the handover of UE 180 from cell 182 to cell 186, UE 176 still may be active via cell 182 (413, 433), UE 178 still may be active via cell 182 (413, 435) and via access point 184 (415, 435), and UE 180 may be active via cell 186 (413, 437). Thus, the active address for UE 180 changed from 1.1.0.3 prior to the handoff of UE 180 from cell 182 to cell 186, to 1.2.0.3 after the handoff of UE 180 from cell 182 to cell 186. Specifically, in this example, the prefix of the address of UE 180 changed to indicate the new network entity associated with UE 180.

Other IP addresses (not necessarily active addresses) may be maintained by a controller. For example, as depicted in device table 494, prior to the handover of UE 180 from cell 182 to cell 186, an address for UE 178 when associated with cell 182 may be 1.1.0.2 (416, 434), an address for UE 178 when associated with cell 186 may be 1.2.0.2 (418, 434), and an address for UE 178 when associated with access point 184 may be 3.0.0.2 (420, 434). Prior to the handover of UE 180 from cell 182 to cell 186, an address for UE 180 when associated with cell 182 may be 1.1.0.3 (416, 436), an address for UE 180 when associated with cell 186 may be 1.2.0.3 (418, 436), and an address for UE 180 when associated with access point 184 may be 3.0.0.3 (420, 436). As depicted in device table 499, after the handover of UE 180 from cell 182 to cell 186, an address for UE 178 when associated with cell 182 may be 1.1.0.2 (417, 435), an address for UE 178 when associated with cell 186 may be 1.2.0.2 (419, 435), and an address for UE 178 when associated with access point 184 may be 3.0.0.2 (421, 435). After the handover of UE 180 from cell 182 to cell 186, an address for UE 180 when associated with cell 182 may be 1.1.0.3 (417, 437), an address for UE 180 when associated with cell 186 may be 1.2.0.3 (419, 437), and an address for UE 180 when associated with cell 184 may be 3.0.0.3 (421, 437).

Controller 190 may maintain the mobility status of a UE associated with controller 190. For example, device table 494 may include an indication of the mobility status of a device prior to the handover of UE 180 from cell 182 to cell 186. As shown in column 422 of device table 494, UE 176 is stationary (S) (422, 432), UE 178 is moving (M) (422, 434), and UE 180 is moving (M) (422, 436). As depicted in device table 499, after the handover of UE 180 from cell 182 to cell 186, UE 176 may be stationary (S) (423, 433), UE 178 may be moving (M) (423, 435), and UE 180 may be moving (M) (423, 437).

Controller 190 may determine to route information based, at least in part, on operator policy, network conditions, device type, device mobility status, network load conditions, etc. For example, controller 190 may determine that information sent to and received from UE 176 (e.g., stationary M2M meter) be via cell 182. This determination may be based on UE 176 being camped onto cell 182, the mobility status of UE 176 being stationary, or the load placed on the network by UE 176 being low.

As another example, controller 190 may determine that voice information sent to and received from UE 178 (e.g., cell phone) may be via cell 186 and that video information sent to and received from UE 178 may be via Wi-Fi AP 184. This determination may be based on the profile associated with UE 178 at a particular subscription or priority level, e.g., a "silver" level, a high network load condition being detected for cell 186, or a low load condition being detected on access point 184.

As another example, controller 190 may determine that information sent to and received from UE 180 may be via cell 182 and cell 186 in order to provide more bandwidth than would be available via a single cell. This determination may be based on cell 182 and cell 186 being co-channel cells (e.g., two eNodeBs using the same radio frequency channel), a large amount of data being downloaded by UE 180 for an update, the profile associated with UE 180 at a particular subscription or priority level, e.g., a higher level (e.g., "platinum" or "gold" level), or UE 180 being a subscriber to a very high speed service.

To effectuate mobility management as described herein, a controller (e.g., controller 190), or the like, may provide prefixes to the access network entities (e.g., cells and APs) with which it is associated. For example, referring to FIG. 2, controller 190 may provide prefix values to cell 182 (prefix value of 1.1), Wi-Fi AP 184 (prefix value of 3.0), and cell 186 (prefix value of 1.2).

Each access network entity (e.g., cell or AP) may provide (e.g., broadcast) its prefix value to the devices. For example, access network entities 182, 184, and 186 may broadcast their prefixes to UEs (e.g., UEs 176, 178, and 180). The addresses may be formatted in accordance with any appropriate format or protocol. In an example configuration, addresses may be in accordance with an IP protocol, e.g., IPv6, IPv4, or the like, or any other IP protocol variants.

A device, upon receipt of a prefix, or prefixes, may append its own host address to generate one or multiple IP addresses, depending on the number of received prefixes. Each device may then use the appropriate generated address (or addresses) when communicating with a network entity, e.g., a controller, a server, etc. The device may then send information by broadcasting to all addresses that are generated.

An access network entity may then receive the information that is broadcasted by the device. The access network entity may then process the information based on instructions received from the controller, which may be based on information in a device table or a network table.

The distributed controllers (e.g., controllers 190, 191, and 193) may perform mobility management functions, such as, for example, setting up tables (e.g., tables 192, 494, and 499) to capture characteristics of neighbor cells/APs, to maintain device information, including adding/removing/updating device entries with location information, mobility status, candidate IP addresses associated with current or past serving cells/APs, active IP address (or addresses), or the like, or any appropriate combination thereof. In the case of multi-homing there may be multiple active IP addresses for a device (e.g., concurrent connectivity among Wi-Fi/cellular integration ISRP, multi-path TCP, etc.).

In a scenario, controller 190 may facilitate a handover by redirecting active device flows from a previous location to a new location and dynamically configuring switching or routing information (e.g., tables) on a switch/router component in order to route user traffic to or from the proper cell(s)/AP(s). For example, UE 176, a power meter, may camp on to cell 182, and have packets of information to send. UE 176 may start the attach procedure to become authenticated. UE 176 also may append its host address (e.g., lower 64 bits of the full IPv6 address 0.1) to the prefix of cell 182 and may send its full IP address associated with cell 182 (i.e., 1.1.0.1) to controller 190 during the attach procedure. Controller 190 may update the device table, e.g., device table 494, to enter the device information. In this example, UE 176 may be a stationary device. Thus, it may have a relatively simple table entry with only one IP address. After UE 176 finishes sending packets, UE 176 may detach. For example, UE 176 may detach after an inactivity timer times out. Subsequently, controller 190 may delete the entries associated with UE 176 from the appropriate table, or tables. The foregoing example illustrates the simplicity of non-mobile access performed in a lightweight, low-state approach. The foregoing example also illustrates scalability for simple devices.

As another example, UE 178 may be used in a multipath scenario. UE 178 is under the coverage of access network entities 182 and 184. In an example configuration, UE 178 may be running a high bandwidth movie download and using Multi Path-Transmission Control Protocol (MP-TCP). UE 178 has an IP address, 1.1.0.2, associated with cell 182. Additionally, UE 178 has an IP address, 3.0.0.2, associated with the Wi-Fi AP 184. The controller may discover device the IP addresses of UE 178 through its allocation (e.g., duplicate address detection (DAD)). Controller 190 may add an entry to the device information table for UE 178 as illustrated herein. Controller 190 may mark both IP addresses associated with access network entities 182 and 184 as active, as shown in device table 494 columns 412 and 414. Controller 190 now may provide intelligence for use of the duplicate paths. Controller 190 may resolve host addresses for UE 178 such that inbound load is distributed via 182 or 184, as appropriate.

As another example, UE 180 may be moving away from access network entity 182 toward access network entity 186, and handover may occur when appropriate handover conditions are met. As described herein, UE 180 may have three valid addresses, 1.1.0.3, 1.2.0.3, 3.0.0.3. Controller 190 may update the entries associated with UE 180 to reflect the handover from access network entity 182 to access network entity 186. After the handover, flows that are ongoing for UE 180 through the access network entity 182 may now be sent to access network entity 186, thus alleviating the need for mobility protocols such as, for example, Identifier-Locator Network Protocol (ILNP), Locator Identifier Separation Protocol-Mobile Node (LISP-MN), or the like.

As described above, the mobility management may be performed in a connectionless manner. However, an application layer may rely on static IP addressing mechanisms to provide services. For example, Internet applications may require communication between the UE and an application server to be established via a constant communication session. In one example, a user may subscribe to a stock market update from an application server. The application server may track changes and provide updates to subscribing UEs. Constant communication sessions may then be established between the application server and the UEs that subscribed to the update. The communication between the UEs and the application server relies on the UEs having static session layer addresses.

Returning to the session management, the method of the present disclosure extends the connectionless procedure to management of sessions. That is, in addition to the connectionless method of mobility management (as described above), the method of the present disclosure also performs connectionless session management.

The session layer IP address of the present disclosure may be formed as a tuple. In one example, the tuple includes the IP address to be used for the service. In another example, the tuple includes the IP address to be used for the service along with one or more of: a port number for the service and an identification of an application protocol for the service.

The session layer address may be assigned by an entity of a serving network and may be a global address that does not change when a device changes a point of attachment. In one example, the assigning of the session layer address may be performed via a controller, e.g., an SDN controller that manages a pool of service IP addresses. In one example, the assigning of the session layer address may be performed by Dynamic Host Configuration Protocol (DHCP) server of a serving network. In one example, the assigning of the session layer address may be via a protocol enhanced over a mobile IP protocol and assigned by a foreign agent.

The session layer address may be formed based on information (e.g., information disclosed in FIGs herein) provided, by the UE, to the entity assigning the session layer IP address. For instance, UE 176 may send a session IP address assignment request by invoking an Address Assignment Request (AAR) procedure. UE 176 may then include additional characteristics related to an application when it sends the session IP address assignment request via the AAR procedure. Then, the network entity that receives the session IP address assignment request (e.g., the foreign agent, the SDN controller or the DHCP server) may create the tuple that includes the session layer IP address using information received from UE 176, e.g., using characteristics, related to an application, that is received from UE 176. The network entity is then able to assign a session layer IP address that is appropriate for the application.

A Dynamic Host Configuration Protocol (DHCP) server may assist with session management. Controllers 190, 191, and 193 may be communicatively coupled with DHCP server 199a or DHCP server 199b of FIG. 1.

A DHCP server address may be stored on a Subscriber Identity Module (SIM) card of a UE (e.g., UE 176). The DHCP server (e.g., DHCP server 199a) may be the DHCP server to which the UE should address session IP address requests. In one example, an address of DHCP server 199a may be stored in a non-volatile memory of the UE 176. DHCP server address may be provided to UE 176 by controller 190. Controller 190 which may accept and process an attachment request from UE 176 may provide the address (or another indicator) associated with DHCP server 199a to UE 176 as part of the attachment procedure. Different DHCP servers may be determined based on a type of service or application. For example, DHCP server 199a may be designated for voice traffic while DHCP server 199b may be designated for video streaming.

In order to request for a session IP address assignment, UE 176 may communicate with DHCP server 199a or 199b using their interface IP address, e.g., UE 176 may send 1.1.0.1. Similarly, UE 178 may send 1.1.0.2 and 3.0.0.2 to be assigned a session IP address for an application accessed via cell 182 and an application accessed via Wi-Fi AP 184, respectively. UE 180 may send 1.1.0.3 to be assigned a session IP address to access a service via cell 182.

Returning to FIG. 3, columns 408-423 were described above in relation to mobility management. Columns 424 and 425 are used for session management in accordance with the present disclosure. Table 494, column 424 contains session IP addresses associated with the UEs 176, 178 and 180 prior to the handover of UE 180 from cell 182 to cell 186. Similarly, table 499, column 425 contains session IP addresses associated with the UEs 176, 178 and 180 after the handover of UE 180 from cell 182 to cell 186. The session IP addresses in columns 424 and 425 are identical, while the active interface IP address of UE 180 has changed from 1.1.0.3 to 1.2.0.3. Thus, the handover for UE 180 is completed while maintaining the same session IP address of 10.10.0.3.

The UEs may move among various cells or among various radio access technologies. Controller 190 may be tasked with maintaining an association between the session layer IP addresses and the interface IP addresses while the UEs move among the various cells or radio access technologies.

In addition, controller 190 may be responsible for providing updates to network switches or routers on how to reach the session layer IP address through the interface IP address. For example, when UE 180 moves to a new location and registers (or updates its registration), the updating of the registration serves as an update to the interface IP address. Controller 190 then updates the association between the session layer IP addresses and the interface IP address in accordance with the latest registration or update. Controller 190 then provides updates to the network switches or routers on how to reach the new interface IP address, and on how to reach the session layer IP address (or addresses) through the new interface IP address.

Figure 4:
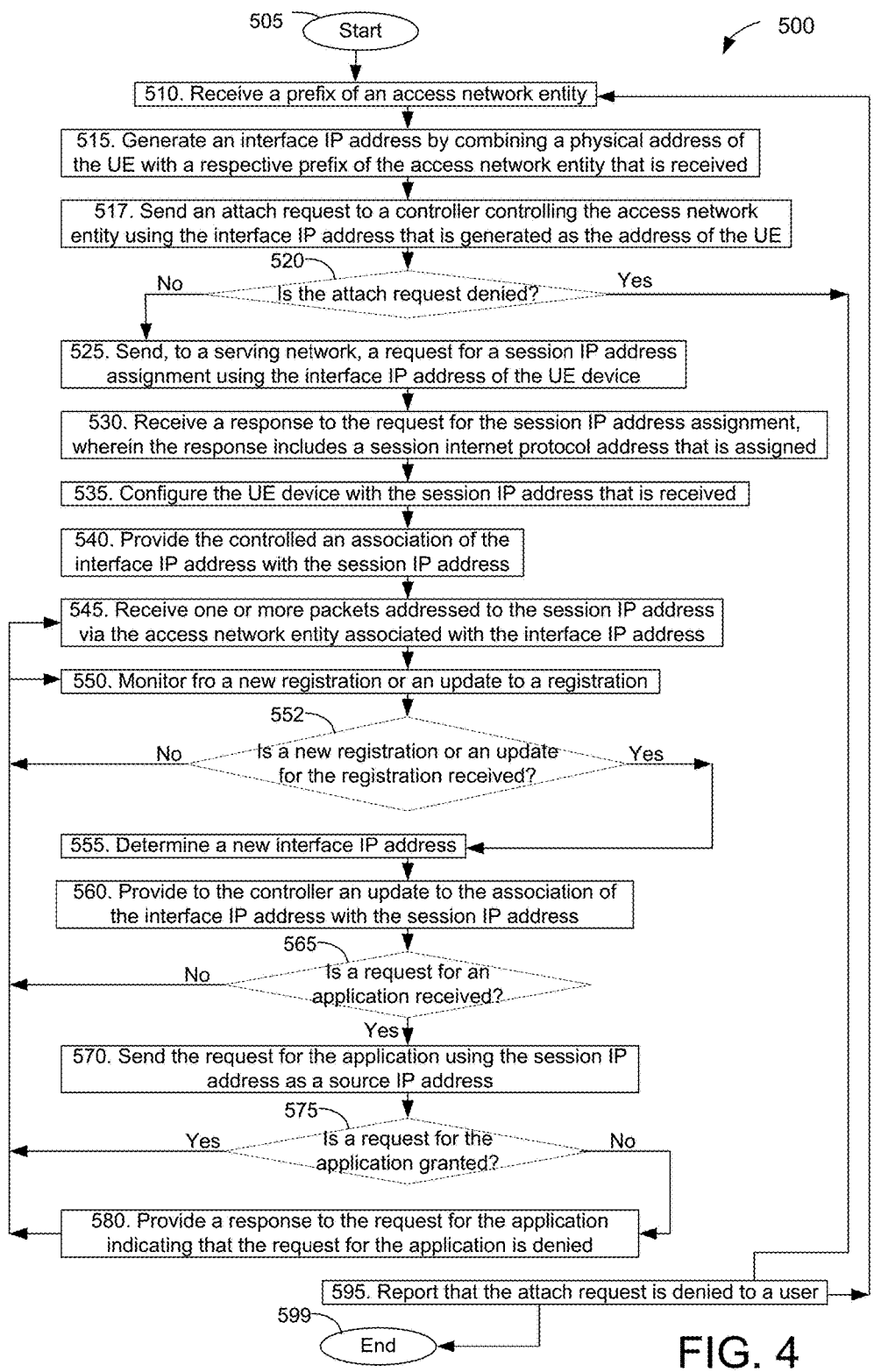
FIG. 4 illustrates an exemplary method for providing session management by an endpoint device in accordance with the present disclosure.

FIG. 4 illustrates a flowchart of an example method 500 for providing session management by a wireless endpoint device (e.g., UE), in accordance with the present disclosure. The method 500 may be implemented in user endpoint (UE) UE 176, UE 178, UE 180, or processor 702 as described in FIG. 9, among other devices. The method 500 starts in step 505 and proceeds to step 510.

In step 510, the processor (e.g., a processor within a UE) receives a prefix of an access network entity, e.g., a cell or a Wi-Fi AP. For example, UE 176, UE 178, or UE 180 receives a prefix for an access point 184 or cell 182 or cell 186. For instance, in FIG. 2, an example prefix for the access point 184 is 3.0, for cell 182 is 1.1, and for cell 186 is 1.2.

In step 515, the processor generates an interface IP address by combining a physical address of the UE with the prefix of the access network entity that is received. For example, UE 176 may generate an interface IP address for communicating via cell 182 as 1.1.0.1. The last portion (0.1) represents the physical address while the first portion (1.1) represents the prefix received by the UE from cell 182.

In step 517, the processor sends an attach request to controller 190 controlling the access network entity using the interface IP address that is generated as the address of the UE. For example, the attach request sent to controller 190 for UE 176 for attachment to cell 182 may use 1.1.0.1 as a source address (address of the UE). Similarly, the attach request sent to controller 190 for UE 180 for attaching to cell 182 may use 1.1.0.3 as a source address for UE 180.

In step 520, the processor determines if the attach request is denied. If the attach request is denied, the method proceeds to step 517 to send the attach request again or to step 595 to report to a UE that the attach request is denied. If the attach request is accepted, the method proceeds to step 525.

In step 525, the processor sends to a serving network a request for a session IP address assignment using the interface IP address of the UE. The request for the session IP address assignment is sent when the attach request is accepted by controller 190 that handles attachment requests for the access network entity.

In one example, the request for the session IP assignment is sent to a controller that manages a pool of session IP addresses. The request for the session IP assignment may be sent to a foreign agent associated with the serving network. The request for the session IP assignment is sent to DHCP server 199a of the serving network. For example, when the UE 176 is successfully attached to the cell, UE 176 may invoke a DHCP procedure by sending a request for a session IP address assignment to DHCP server 199a or DHCP server 199b using its interface IP address (e.g., 1.1.0.1) as the source for the request.

An identification of DHCP server 199a to which the request for the session IP address assignment is to be directed may be received from controller 190. In one example, an identification of DHCP server 199a to which the request for the session IP address assignment is to be directed is provided to UE 180 in a response to the attach request. In one example, an identification of DHCP server 199a to which the request for the session IP address assignment is to be directed is obtained from a Subscriber Identity Module (SIM) card of the UE 180. In one example, an identification of DHCP server 199a to which the request for the session IP address assignment is to be directed is obtained from a non-volatile memory of UE 180.

The request for the session IP address assignment may include one or more characteristics related to an application. The characteristics related to an application may be used to assign a session IP address that is proper for the application. In one example, the characteristics related to an application may also be used for identifying a proper range for ports and a proper range for identification for the application.

In step 530, the processor receives a response to the request for the session IP address assignment, wherein the response includes a session internet protocol address that is assigned. The response to the request for the session IP address assignment may be received as a tuple. The tuple may include a session IP address for a service. In a scenario, the tuple includes the session IP address for a service along with one or more of: a port number for the service and an identification of an application protocol for the service. For an illustrative example, UE 176 may receive a session IP address of 10.10.0.1, UE 178 may receive a session IP address of 10.10.0.2, and UE 180 may receive a session IP address of 10.10.0.3, as shown in FIG. 3.

In step 535, the processor configures the UE with the session IP address that is received. For example, for each session IP address that is received, the processor configures the respective session IP address to be used.

In step 540, the processor provides to controller 190 an association of the interface IP address with the session IP address. For example, controller 190, which handles packets addressed to the session IP address, needs to be notified, such that packets from applications that use the session IP address can reach UE 180 via the interface IP address.

In step 545, the processor receives one or more packets addressed to the session IP address via the access network entity associated with the interface IP address. The processor sends one or more packets for the application using the session IP address.

In step 550, the processor monitors for a new registration or an update to a registration. In step 552, the processor determines if either a new registration or an update to the registration is received. If no new registration or update is received, the processor returns to step 545 or 550 to continue sending/receiving packets and monitoring for changes. Otherwise, the processor proceeds to step 555.

In step 555, the processor determines a new interface IP address. For example, if the UE moved and an update to a registration is performed, the access network entity (e.g., cell or Wi-Fi AP) serving the UE would now be different. Thus, the prefix of the access network entity needs to be updated to replace the prefix of the old access network entity with the prefix of the new access network entity. For example, if UE 180 moved from cell 182 to cell 186, the prefix of cell 182 (1.1) is replaced by the prefix of cell 186 (1.2). The old interface IP address of UE 180 is 1.1.0.3. Then, the interface IP address of UE 180 becomes 1.2.0.3

In step 560, the processor provides to controller 190 an update to the association of the interface IP address with the session IP address. For example, UE 180 provides the new interface IP address as being the interface IP address associated with the session IP address.

In step 565, the processor determines if a request for an application is received. For instance, UE 180 may receive a request from a user for downloading Google maps. For example, the request may be received via an interface for user interaction. In another example, UE 180 may receive a request for receiving stock updates from an application server (e.g., a push of a stock update). If no request for an application is received, proceed to step 545 or 550. Otherwise, the processor proceeds to step 570.

In step 570, the processor sends the request for the application using the session IP address as a source IP address. For example, UE 180 may send a request for a Google map using 10.10.0.3 as its session IP address.

In step 575, the processor determines if the request for the application is granted. If the request is granted, the processor may then proceed to step 545 or 550. Otherwise, the processor proceeds to step 580.

In step 580, the processor provides a response to the request for the application indicating that the request for the application is denied. The method then proceeds to step 545 or 550.

In step 595, the processor reports that the attach request is denied to a user. The method then may return to step 510, or proceeds to step 599 to end the process.

Figure 5:
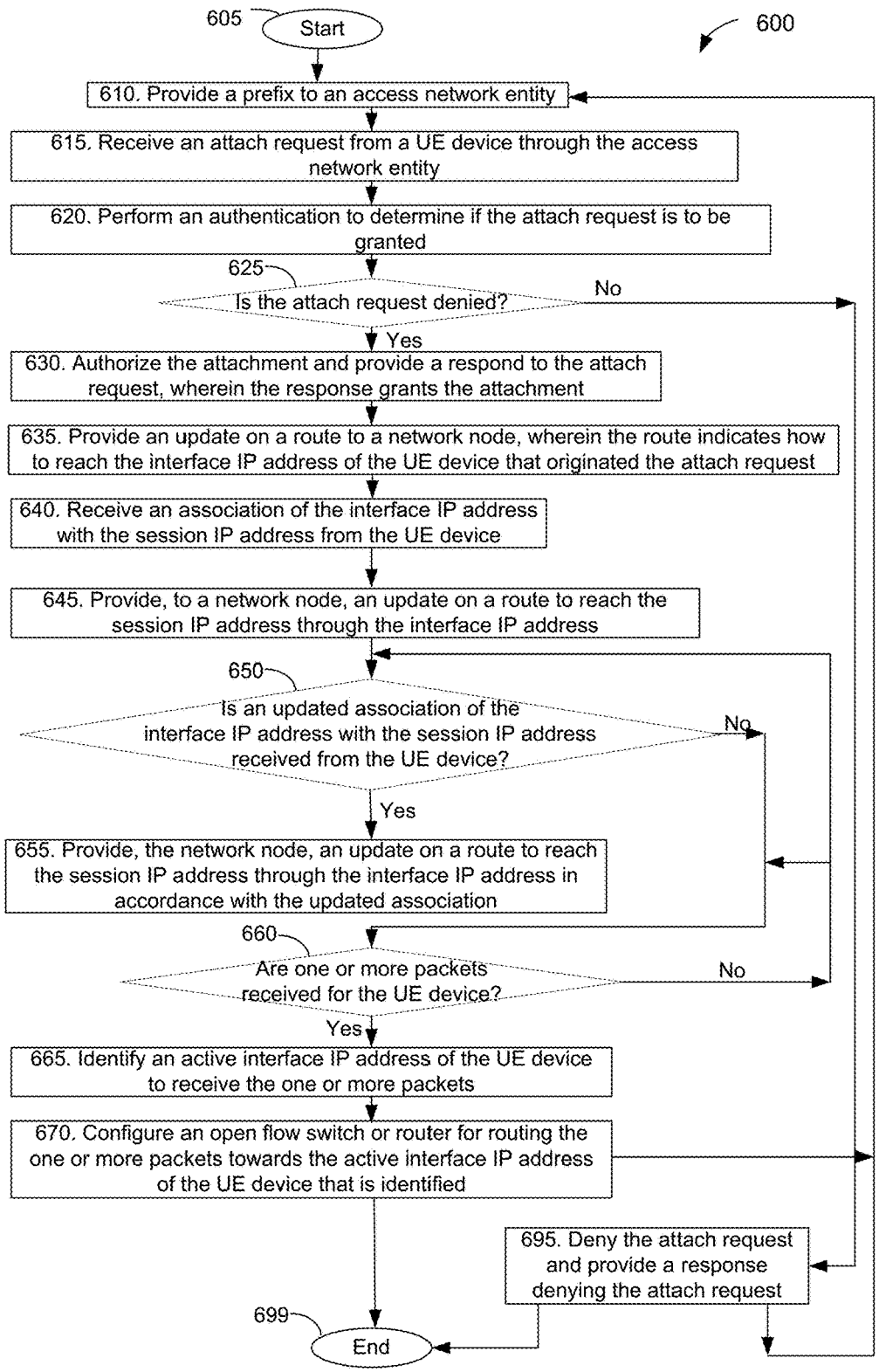
FIG. 5 illustrates an exemplary method for providing session management by a controller in accordance with the present disclosure.

FIG. 5 illustrates a flowchart of an example method 600 for providing session management, e.g., by controller 190, in accordance with the present disclosure. The method 600 may be implemented in an SDN controller of a network, e.g., a network of a communications service provider. The method 600 starts in step 605 and proceeds to step 610.

In step 610, the processor (e.g., the processor of controller 190) provides a prefix to an access network entity. For example, a controller 190 may provide a prefix to a cell site 182 or 186, or to Wi-Fi AP 184.

In step 615, the processor receives an attach request from a UE through the access network entity. For example, controller 190 may receive, through cell 182, an attach request from UE 178 for attaching to cell 182. Similarly, the controller 190 may receive, through Wi-Fi AP 184, an attach request from UE 178 for attaching to Wi-Fi AP 184.

In step 620, the processor performs an authentication to determine if the attach request is to be granted. For example, the authentication may be based on services to which the user has subscribed.

In step 625, the processor determines whether the authentication is successful. If the authentication is successful, the processor proceeds to step 630. Otherwise, the processor proceeds to step 695.

In step 630, the processor authorizes the attachment and provides a respond to the attach request, wherein the response grants the attachment. In one example, the response to the attach request includes a preferred Dynamic Host Configuration Protocol (DHCP) server.

In step 635, the processor provides an update on a route to a network node (e.g., to a router, a switch or a gateway), wherein the route indicates how to reach the interface IP address of the UE. For example, UE 176 may be reached via interface IP address 1.1.0.1, UE 178 may be reached via interface IP addresses 1.1.0.2 and 3.0.0.2, and UE 180 may be reached via interface IP address 1.1.0.3.

In step 640, the processor receives an association of the interface IP address with the session IP address from the UE. For example, the UE 176, 178 or 180 sends, to the controller 190, its own interface IP address with the session IP address it received from the DHCP server.

In step 645, the processor provides to a network node (e.g., the router or the switch), an update on a route to reach the session IP address through the interface IP address.

In step 650, the processor determines whether an updated association of the interface IP address with the session IP address is received from the UE. If an updated association is received the processor proceeds to step 655. Otherwise, the method proceeds to step 660.

In step 655, the processor provides, the network node, an update on a route to reach the session IP address through the interface IP address in accordance with the updated association. For example, routers or switches are provided routing information on how to reach the session IP address through the interface IP address.

In step 660, the processor determines whether one or more packets are received for the UE. If no packet is received, the processor proceeds to steps 650 or step 660. Otherwise, the processor proceeds to step 665.

In step 665, the processor identifies an active interface IP address of the UE to receive the one or more packets. For example, for UE 180, the controller may identify the active interface IP address as being 1.1.0.3. In other words, the interface IP address associated with the session IP address 10.10.0.3 is identified as being 1.1.0.3.

In step 670, the processor configures an open flow (OF) switch or router for routing the one or more packets towards the active interface IP address of the UE that is identified. For example, the packets that are received for the UE 180 are to be routed using the IP address 1.1.0.3 through cell 182. The packets are then routed to the UE by the OF switch or router in accordance with the configuration. The method then either returns to step 610 or to step 699 to end the process. It is important to note that the OF may be already configured correctly. In which case, the configuration may simply be verified by comparing a latest known active interface IP address to the latest configuration of the OF.

As described above, the session IP address does not change when the UE physically moves from one location to another. The Google server or stock update server, described above, may continue providing updates using the same session IP address as the destination. The controller receives updates from the UE regarding any new association between the interface IP addresses and session IP addresses (described in step 650 above). When, the controller receives packets, it performs a lookup to determine which interface IP address is active (described in step 665 above), configures the OF switch/router (described in step 670 above) to route the packets via the active interface IP address. The packets then reach via the OF switch/router through the latest active interface IP address.

In step 695, the processor denies the attach request and provides a response denying the attach request. The method then either returns to step 610, or to step 699 to end the process.

To illustrate the interworking between methods 500 and 600 described above, suppose UE 180 shown in FIG. 1 (which has a suffix of 0.3) registers at cell 182 (prefix of 1.1) and then the user physically moves towards cell 186 (prefix of 1.2) via path 195. Suppose UE 180 has registered at a stock update server to get push updates for any changes of a stock, e.g., company ABC, for more than $1. The stock update server then needs to continue providing the updates as UE 180 moves around. The interworking of methods 500 and 600 proceeds as follows. First, UE 180 is served by cell 182 with its interface IP address being 1.1.0.3 and session IP address being 10.10.0.3 as shown in FIG. 3, device table 494. The stock update server uses the session IP address (e.g., 10.10.0.3) as the destination IP address when it pushes updates towards UE 180. The controller performs step 665 to identify an active interface IP address of the UE 180 for receiving one or more packets for the stock update. For example, the controller identifies 1.1.0.3 as being the active interface IP address. The controller then performs step 670 to configure an open flow (OF) switch or router for routing the one or more packets towards the active interface IP address (e.g., 1.1.0.3).

As UE 180 moves towards cell 186, UE 180 is handed over to cell 186. UE 180 performs step 555 to determine a new interface IP address (e.g., 1.2.0.3) and sends an update. UE 180 then performs step 560 to provide to the controller an update to the association of the interface IP address with the session IP address. The update indicates that the active interface IP address is 1.2.0.3 for the session address 10.10.0.3. The controller determines whether an updated association of the interface IP address with the session IP address is received from UE 180 and provides the network nodes an update on a route to reach the session IP address (e.g., 10.10.0.3) through the new interface IP address (e.g., 1.2.0.3). If one or more packets are received for UE 180, the controller performs step 665 to identify an active interface IP address of the UE 180 (e.g., 1.2.0.3) to receive the one or more packets. The controller then performs step 670 to configure an OF switch or router for routing the one or more packets towards the active interface IP address (e.g., 1.2.0.3) of the UE that is identified. For example, after the handover is completed, the stock update server continues to use the session IP address 10.10.0.3 for pushes towards UE 180. In other words, the controller is used for identifying the active interface IP address through which packets with destination address indicating the session IP address reach the UE.

The method of the present disclosure provides several advantages. As described above, the method provides two separate types of addresses for a UE, one type to be used for physical attachment of the device to a network as described above (i.e., interface IP address), and another type for the application layer to provide application services (i.e., session layer IP addresses). Hence, the method of the present disclosure operates without the need for PDP contexts. The method of the present disclosure eliminates complex interactions between mobility management and session management procedures, and provides connectionless wireless access networks. Reducing the complexity of the procedures performed by UEs may also improve energy consumption by the UEs.

Moreover, as described herein, the session layer IP addresses of the present method are not assigned by the P-GW. Rather, the session layer IP address is assigned by an entity of a serving network, e.g., a controller, a foreign agent, etc. As such, a common session layer IP address is assigned by the entity of a serving network. The common session layer IP address enables the session management to seamlessly continue, unaffected, as the UE moves to a coverage area of another P-GW or another radio access network technology. For example, if a UE moves to an area where the application is better served on a Wi-Fi network, an ongoing session may be continued as the UE attaches to a Wi-Fi AP and detaches from another access network, e.g., 5G access technology, LTE, etc.

The methods of the present disclosure may be implemented without impacting layers 4-7 of the Open Systems Interconnection (OSI) protocol stack. The layers 4-7 include the transport layer, session layer, presentation layer and application layers, respectively. The method may be used to support connection oriented sessions (i.e., Transmission Control Protocol (TCP) or Stream Control Transmission Protocol (SCTP) sessions) as well as connectionless sessions (i.e., User Datagram Protocol (UDP) or Real-Time Transport Protocol (RTP) sessions).

Below is subject matter for a wireless network with a connectionless architecture with further details regarding implementing features that may include carrier aggregation (CA) and dual connectivity (DC) based on session layer IP address. Without the CA/DC feature discussed below for a wireless network with a connectionless architecture, it might be limited if a given session is desired to be carried across multiple access points/cells to take advantage of CA or DC. The methods, systems, or apparatuses discussed in more detail herein, and particularly below, may help resolve the aforementioned limitation by using addresses non-common to network headers, such as physical IP address. For example, UE identifiers, such as IMSI, may be used.

CA may allow data to be simultaneously transmitted on two bands to a single UE. The use CA may result in increased downlink speed across the coverage area, efficient use of spectrum, and higher capacity. Each aggregated carrier may be referred to as a component carrier, CC. Multiple component carriers are combined to increase bandwidth through a particular interface of a UE, such as an LTE antenna of UE 180. Disparate spectrum bands may be bonded to add capacity and provide faster data rates in wireless networks. For example, a network provide may provide 300 Mbps downlink speeds by aggregating 20 MHz and 10 MHz carriers in the 800 MHz and 1800 MHz bands. CA concept can also be used in 5G. The CA concept may apply to any radio technology that has a proper protocol to aggregate the allocated spectrums to one single logical continuous spectrum. Here, the connectionless core network technology and protocol can also help a radio access network to set up CA and utilize the benefits of the CA feature, instead of using LTE (or the like) connection-oriented control protocols with heavy signaling overhead in order to utilize the CA feature.

DC may be defined to extend CA or coordinated multipoint (CoMP) concepts to inter-base station (e.g., inter-eNB)

with non-ideal backhaul. In DC operation, a multiple Rx/Tx UE in RRC_CONNECTED may be configured to utilize radio resources provided by multiple (e.g., two) distinct air link schedulers, located in two eNBs connected, via a non-ideal backhaul over the X2 interface (3GPP TS 36.300). Dual connectivity (DC) allows UEs to receive data simultaneously from different base stations in order to boost the performance in a heterogeneous network with dedicated carrier deployment. For example, UE connections may be anchored to a macro cell on one frequency while boosting data-rates via the small cell on a different frequency. DC concept is also used in 5G, where the primary and sencondary cells within the DC can be from same or different radio technologies, e.g. LTE and 5G radios. The DC concept may be extended to any radio and network technology with a proper network control protocol. Here, the connectionless core network technology and protocol may be more flexible and self-optimized to support multiple data paths from a UE through multiple Radio Access points without involving extensive connection-oriented signalling to set up multiple circuits. The multiple path support in a connectionless core network may be automated as a part of Routing Information updates or a part of SDN-controller information updates. For example, UE 178 may have the flexibility to choose its communication paths and the network has the ability to detect, add, or delete a data path of UE 178 in real time to optimize the user data deliveries.

Figure 6:
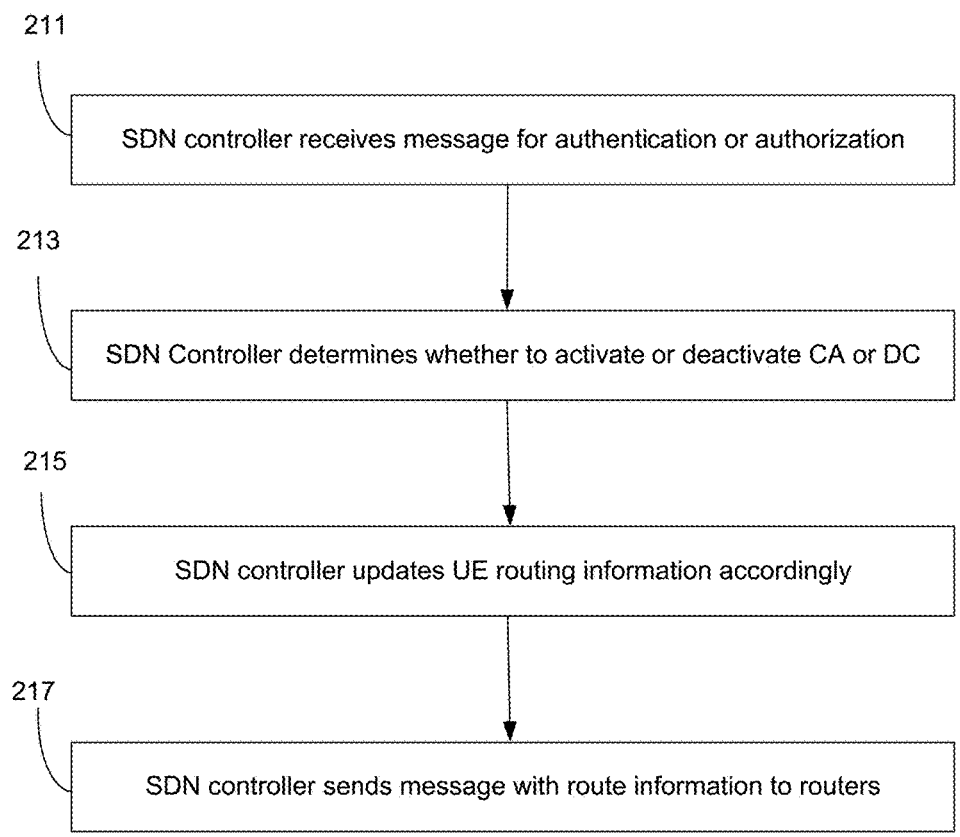
FIG. 6 illustrates an exemplary method for providing session management by a controller with regard to carrier aggregation or dual connectivity in accordance with the present disclosure.

FIG. 6 illustrates an exemplary method for CA or DC in a connectionless wireless network as disclosed herein. At step 211, controller 190 receives a message for authentication or authorization. For example, UE 178 powers on and camps on cell 182. It initiates the attachment procedure to the wireless access network (or for NB-IoT device, it can use RACH to transmit packets directly). In the attachment message, UE 178 informs cell 182 (e.g., eNB) whether it is CA-capable, DC-capable (multiple Rx/Tx UE), or the like feature. Cell 182 forwards the attachment message to controller 191 for authentication or authorization in order to gain access to the connectionless wireless network. The attachment message may provide information regarding triggers (thresholds) that activate or make capable CA or DC as discussed below.

At step 213, controller 190 (or the serving or primary cell—cell 182) determines the policies on when and whether to activate or deactivate CA or DC for UE 178. For instance, in the case of CA, if UE 178 is CA-capable and the CA trigger conditions (e.g., radio conditions associated with S-cells (serving cells), cell load condition of itself and S-cells, etc.) are met, controller 190 (performing the CA scheduler function) may activate CA in coordination with the P-cell (primary cell) and S-cell. It should be understood that if S-cell sent all received air link traffic to the P-cell for backhauling, there is no backhaul data path change and no SDN controller involvement. If S-cell decides to send the received air link data directly through its backhaul, multi-path updates may be sent to the SDN controller and the SDN controller propagates the new routing information to the routers or switches in the core network.

The connectionless network operating mode may allow the air link scheduler to work in an asynchronous mode (e.g., logical link setup among P-cell, S-cell, and UE in order to logically identify each UE packet at the link layer and no dedicated time slots need to be assigned or otherwise reserved to share the air link resources). The packets may have one unique UE identifier and source/destination IP transport addresses. The air link scheduler may schedule a UE packet transmission in real-time directly based on the UE identity, source/destination transport addresses, or packet QoS tag information. This may improve the air link scheduler and the spectrum utilization and efficiency by packet statistical multiplexing, compared with the logical circuit-based communication protocols. In the case of DC, if UE 178 is DC-capable and the DC trigger conditions (e.g., radio conditions, cell load condition of itself or neighboring cells, etc.) are met, UE 178 (which may perform a PDCP flow control function) may activate DC in coordination with the master eNB and the secondary eNB, and inform UE 178 of the secondary cell, (e.g., secondary eNB—SeNB), which may be small cell, activation for DC. The Secondary eNB updates the SDN controller about the new user data path in the access network, in coordination with the Master eNB. The SDN controller makes the routing updates to all the core routers and switches.

With continued reference to step 213 of FIG. 6, subsequent to and based on success of the attachment procedure, the DHCP procedure to obtain the session address tuple may begin. Details with regard to the DHCP procedure are discussed in more detail herein with reference to DHCP server 199a and DHCP server 199b. DHCP server 199a may send controller 190 information about the association between the session layer IP address and UE IMSI (or IMSI+IMEI). Note IMSI+IMEI may be used if multiple devices share the same IMSI.

At step 215, controller 190 updates UE routing information accordingly. As shown in FIG. 7, the table provides an exemplary UE routing information table that includes the association of UE IMSI with cell-id(s), including P-cell (primary cell) and S-cell (secondary cell) for CA, and MeNB (master eNB) and SeNB (secondary eNB) for DC, from step 213. The UE information table of FIG. 7 may include the association of UE IMSI with UE session IP address. As shown in FIG. 7, the table may indicate whether CA or DC is active or capable. Active may indicate that the UE in conjunction with one or more base stations are using DC or CA.

Capability may be based on hardware, software, or operating conditions. If a UE 176 does not have the multiple antennas, for example, or other hardware then it may be marked as not capable. The table may be more specific and provide that is not capable according to a general or specific hardware issue. Software capable may be considered on multiple levels. In an example, there may be an operating system (software) issue that will not allow for CA or DC. In another example, the capability of CA or DC may be based on a per application basis. Although not shown in FIG. 7, in a scenario, a first software application on UE 176 may be capable of using CA, but a second software application on UE 176 may not be capable of using DC. Each software application may have a session IP address. Each session IP address may be indicated in the table whether it is capable, not capable, or active. When the first software application (with a first session IP address) is sending or receiving data, CA may be activated during the session, for example. When the second software application (with a second session IP address) is sending or receiving data, DC may be deactivated (e.g., indicate not capable). It is contemplated herein that "capable" may be based on software configuration, network conditions, lack of hardware, or lack of software (e.g., appropriately configured operating system). With regard to network conditions, the capability may be based on whether network conditions reach one or more threshold levels (e.g., trigger conditions as discussed in step 213), which may be associated with load on network links (traffic or bandwidth), load on network devices (e.g., processor, memory), time of day, emergency alert level on the network, quality of service, packet loss, UE service plan, geographic location not necessarily tied to base station (e.g., different locations served by the same base station may provide different indications of feature availability), or other factors (e.g., FIG. 2). "Not capable" may be just that the feature (e.g., DC or CA) is turned off, that the hardware or software does not have the configuration to allow it to operate, or that that a network condition did not reach a threshold level that triggers the feature to be capable. In an example, a first threshold may be met so that the feature is capable to be turned on (e.g., user associated with UE 178 or other network entity may be provided an indication that the feature may be turned on if desired), then a second threshold may be met so that the feature is activated (e.g., the feature CA is automatically turned on to help data to be downloaded or uploaded more quickly).

At step 217, controller 190 sends a message with UE route information of step 215 to routers or other affected devices (e.g., switches, eNB). RAN may route the data packets to UE 178 per IMSI via one or more cells. For mobility, once UE 178 moves to new serving P-cell/MeNB or to the S-cell/SeNB, controller 190 updates the association between UE (IMSI), the session IP address, and new P/S-cell, and MeNB/SeNB (and their associated IP addresses), such that the SDN controller may update the switches or routers (which may be gateways) on how to reach UE 178 via the updated P-cell/MeNB, or to the S-cell/SeNB. The physical IP address for UE 178 is related to physical connectivity and routing. It is associated with network access point. The physical IP address may change when the UE 178 moves from one eNB to another. From application perspective, when an application server, e.g. a stock broker server, needs to communicate with UE 178, a relative static IP address (the session IP address) is preferred when connecting with UE 178. Again, the session IP address is relative static IP addressing mechanism that is particularly significant for moving devices. IP session address may not change when a device changes the point of attachment. It is contemplated herein that the session IP address may be assigned when a device is moving at a threshold speed (e.g. 10 miles per hour) or attached to a particular application.

For additional perspective, it should be understood that many Internet application protocols are connection-oriented. For example, the HTTP protocol for web browsing runs over the TCP/IP protocol. TCP is a connection-oriented session transport protocol. It requires no end-point IP address change during a HTTP session. This is easy for a desktop PC at home. That PC or the home router has a fix link layer connection to the Internet Edge Router that is close to a home (e.g., it is the ISP router provided by the cable company). So the packet routing for a fixed network is fairly straight forward since there is a fixed IP and a fixed physical link to the home. It is not easy for mobile device that move around frequently. The wireless network tracks mobile devices (e.g., UE 178) in a way that minimizes the impacts to the external application servers. Therefore a fixed IP address is relevant. A difference lies in the link layer handling. In the conventional connection-oriented wireless network, the core network and the RAN try to set up logical links to track the UE 178 and associate the logical link with the UE session IP address. For each logical link establishment, handover, and release, there will be signalling messages between the core network, the RAN, and the UE 178 to manage the logical links. This conventional method is a significant load on the wireless network. Logical links in the conventional connection-oriented wireless network may be compared to the circuits in the old telephone network. Disclosed herein are methods that help establish a connectionless packet wireless network (i.e., packet-oriented wireless network for mobile devices), like the packet-oriented Internet. There is no circuit needed. The packet routing is based on the UE identity and the IP layer transport addresses in each packet. For example, UE 178 may send data at any time after the registration, without the need to request the resource reservation in the wireless network, without the need to request a "circuit" for transmission, or without the need to assign a timeslot in the scheduler for transmission, since the schedule is asynchronous. Therefore, the connectionless network architecture may improve the network utilization or the spectrum efficiency.

The use of physical layer IP address is to address the mobility and handover. The wireless SDN controller needs to know the UE 178 current point of attachments. But the UE session IP address should not be changed for every handover or every change of point of attachment. Otherwise, it would impact the session continuity when UE 178 is moving. The physical IPs identify the point of the attachment the UE 178 is currently located. The physical address space belongs to each radio access point (e.g., eNB). Essentially, the radio access point is a small router and the edge router of the UE 178. The radio access points will keep updating the SDN controller (e.g., controller 190), in order to reach the UE 178 (e.g., providing instructions to please go through this physical IP address as the next hop address and the packet will be routed to UE 178 eventually). The SDN controller updates the core router routing tables to reflect the proper routing path towards the UE 178. Here, the native IP routing protocol capability is used in a wireless network with mobile devices. This approached provides more of a packet-based wireless network than is provided in conventional wireless networks.

The present disclosure provides advancement in the technical field of receiving session management that is connectionless. This advancement improves the ability of a UE to receive applications and services without a need for coupling physical internet protocol addresses (i.e., interface IP addresses) to session level internet protocol addresses (i.e., session IP addresses). The UE 178 may change locations, thereby changing the interface IP address while continuing to receive packets via a constant (same) session IP address. The controller is tasked with the responsibility for determining a latest active address that corresponds to a session internet protocol address. The session may then be maintained in a connectionless manner, thereby improving session management for application layer communication.

Figure 8:
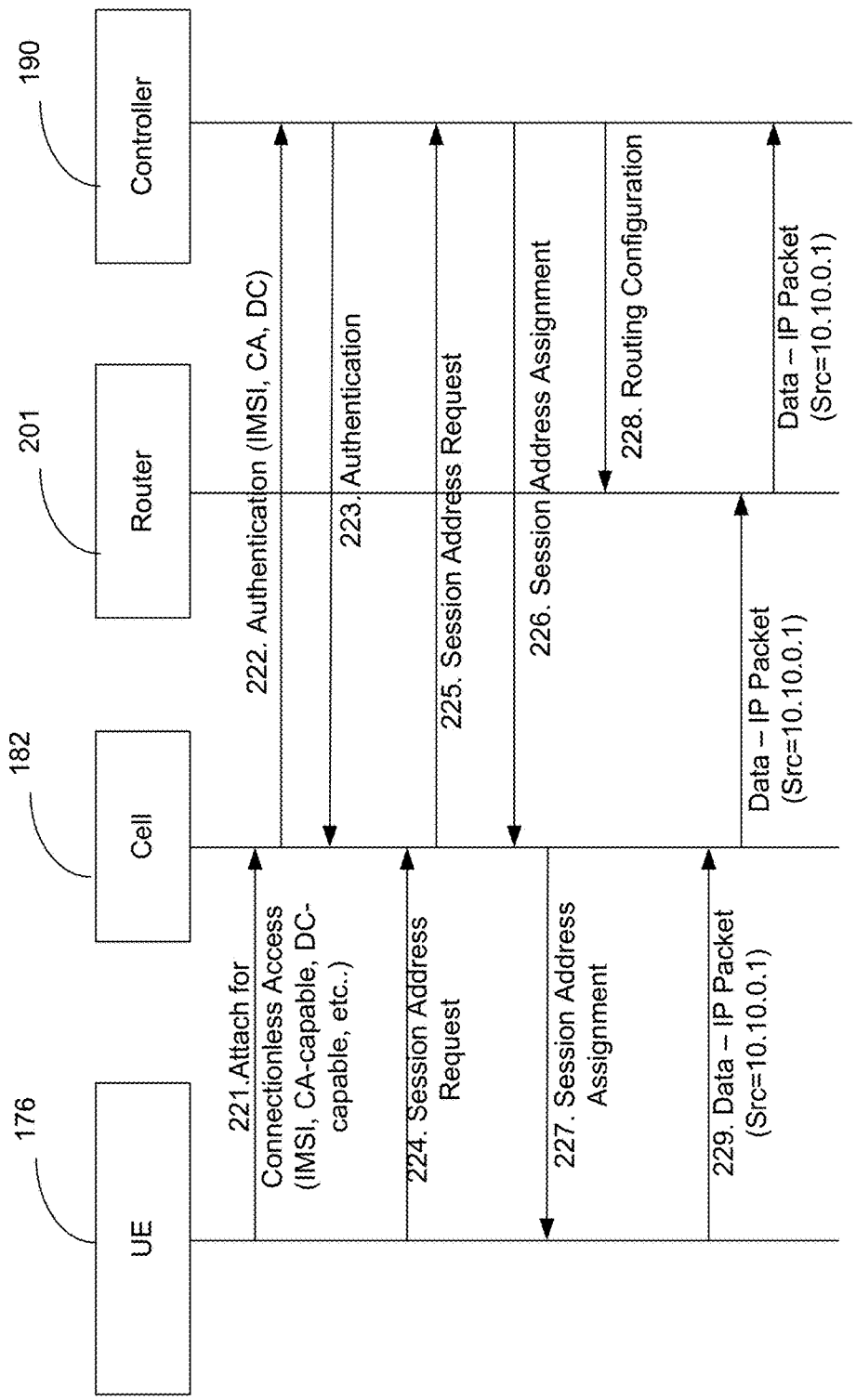
FIG. 8 illustrates an exemplary method flow for a connectionless wireless network as disclosed herein.

FIG. 8 illustrates an exemplary method flow for a connectionless wireless network as disclosed herein. At step 221, UE 176 sends an attach message. The attach message may include IMSI, CA-capable information, DC-capable information, among other things. At step 222, cell 182 (e.g., an eNB) may forward the information of step 221 to controller 190 for authentication. At step 223, controller 190 may authenticate UE 176 to cell 182. At step 224, UE 176 may send a session address request to cell 182, which at step 225 the session address request is forward to controller 190. At step 226, controller 190 sends a session address assignment (e.g., an IP address for session on UE) to cell 182, which is forward at step 227 to UE 176. Controller 190 provides the mobility routing control function by keeping track of the serving cell-id (or cell-id's in the case of carrier aggregation, or dual connectivity) associated with this UE, identified by its IMSI. Controller 190 also maintains the mapping between the session address(es) and IMSI, for session management, including session continuity. At step 228, controller 190 sends routing information to router 201, which may include information in the table of FIG. 7.

Figure 9:
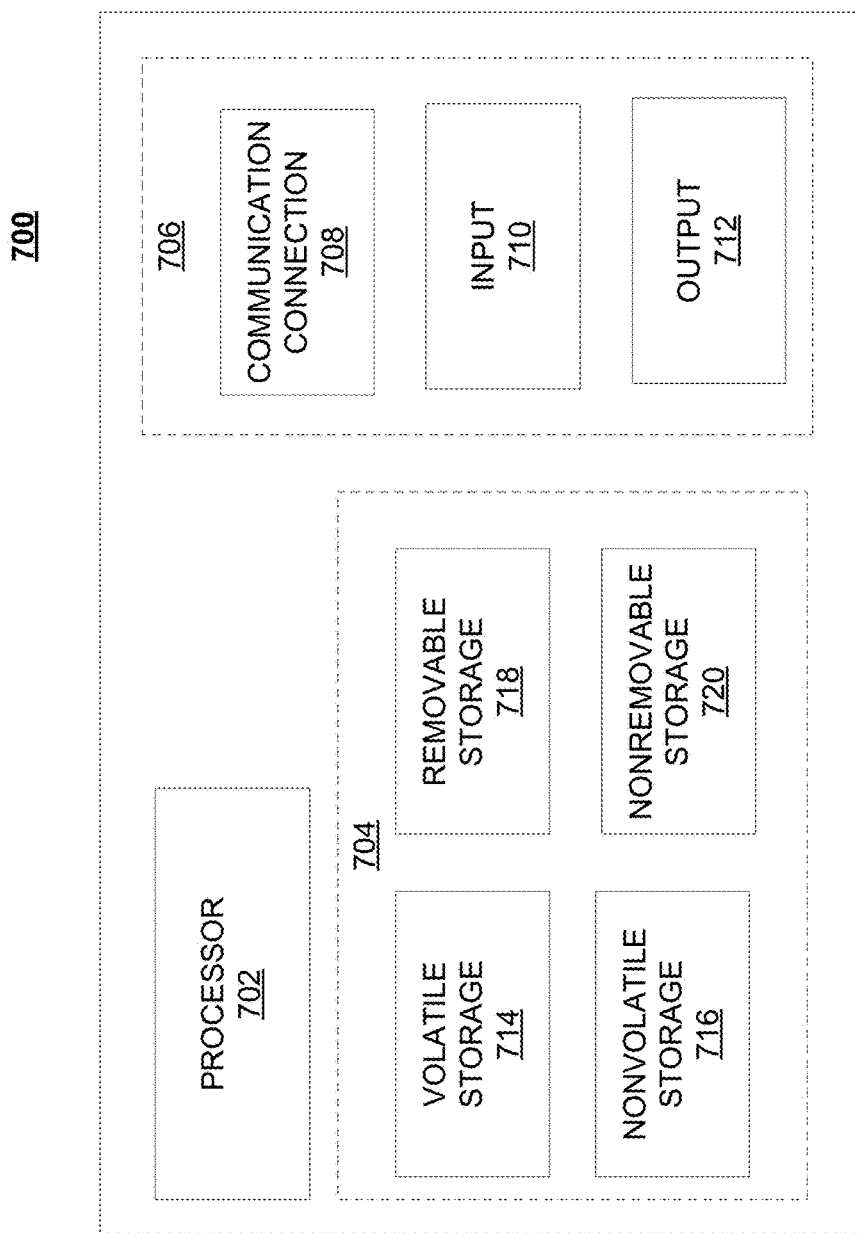
FIG. 9 illustrates a schematic of an exemplary network device.

FIG. 9 is a block diagram of network device 700 that may be connected to or include a component of network 100, such as UE 178, controller 190, cell 182, or the like. Network device 700 may include hardware or a combination of hardware and software. The functionality to facilitate telecommunications via a telecommunications network may reside in one or combination of network devices 700. Network device 700, depicted in FIG. 9, may represent or perform functionality of an appropriate network device 700, or combination of network devices 700, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 9 is exemplary and not intended to imply a limitation to a specific implementation or configuration. Thus, network device 700 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 700 may include a processor 702 and a memory 704 coupled to processor 702. Memory 704 may contain executable instructions that, when executed by processor 702, cause processor 702 to effectuate operations associated with mapping wireless signal strength. As evident from the description herein, network device 700 is not to be construed as software per se.

In addition to processor 702 and memory 704, network device 700 may include an input/output system 706. Processor 702, memory 704, and input/output system 706 may be coupled together (coupling not shown in FIG. 9) to allow communications between them. Each portion of network device 700 may include circuitry for performing functions associated with each respective portion. Thus, each portion may include hardware, or a combination of hardware and software. Accordingly, each portion of network device 700 is not to be construed as software per se. Input/output system 706 may be capable of receiving or providing information from or to a communications device or other network entities configured for telecommunications. For example input/output system 706 may include a wireless communications (e.g., 3G/4G/GPS) card. Input/output system 706 may be capable of receiving or sending video information, audio information, control information, image information, data, or any combination thereof. Input/output system 706 may be capable of transferring information with network device 700. In various configurations, input/output system 706 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 706 may include a Wi-Fi finder, a two-way GPS chipset or equivalent, or the like, or a combination thereof.

Input/output system 706 of network device 700 also may contain a communication connection 708 that allows network device 700 to communicate with other devices, network entities, or the like. Communication connection 708 may include communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 706 also may include an input device 710 such as keyboard, mouse, pen, voice input device, or touch input device. Input/output system 706 may also include an output device 712, such as a display, speakers, or a printer.

Processor 702 may be capable of performing functions associated with telecommunications, such as functions for processing broadcast messages, as described herein. For example, processor 702 may be capable of, in conjunction with any other portion of network device 700, determining a type of broadcast message and acting according to the broadcast message type or content, as described herein.

Memory 704 of network device 700 may include a storage medium having a concrete, tangible, physical structure. As is known, a signal does not have a concrete, tangible, physical structure. Memory 704, as well as any computer-readable storage medium described herein, is not to be construed as a signal. Memory 704, as well as any computer-readable storage medium described herein, is not to be construed as a transient signal. Memory 704, as well as any computer-readable storage medium described herein, is not to be construed as a propagating signal. Memory 704, as well as any computer-readable storage medium described herein, is to be construed as an article of manufacture.

Memory 704 may store any information utilized in conjunction with telecommunications. Depending upon the exact configuration or type of processor, memory 704 may include a volatile storage 714 (such as some types of RAM), a nonvolatile storage 716 (such as ROM, flash memory), or a combination thereof. Memory 704 may include additional storage (e.g., a removable storage 718 or a non-removable storage 720) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 700. Memory 704 may include executable instructions that, when executed by processor 702, cause processor 702 to effectuate operations to map signal strengths in an area of interest.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which messages for connectionless wireless networks (e.g. UE route information message from controller 190) may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—connectionless wireless networks that may manage CA or DC via disclosed session management techniques—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. Threshold (trigger) disclosed herein are non-zero thresholds.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods—FIG. 4 thru FIG. 6—disclosed herein). Such other examples are intended to be within the scope of the claims if they have structural elements that do not differ from the literal language of the claims, or if they include equivalent structural elements with insubstantial differences from the literal languages of the claims.

Figures 10, 11:
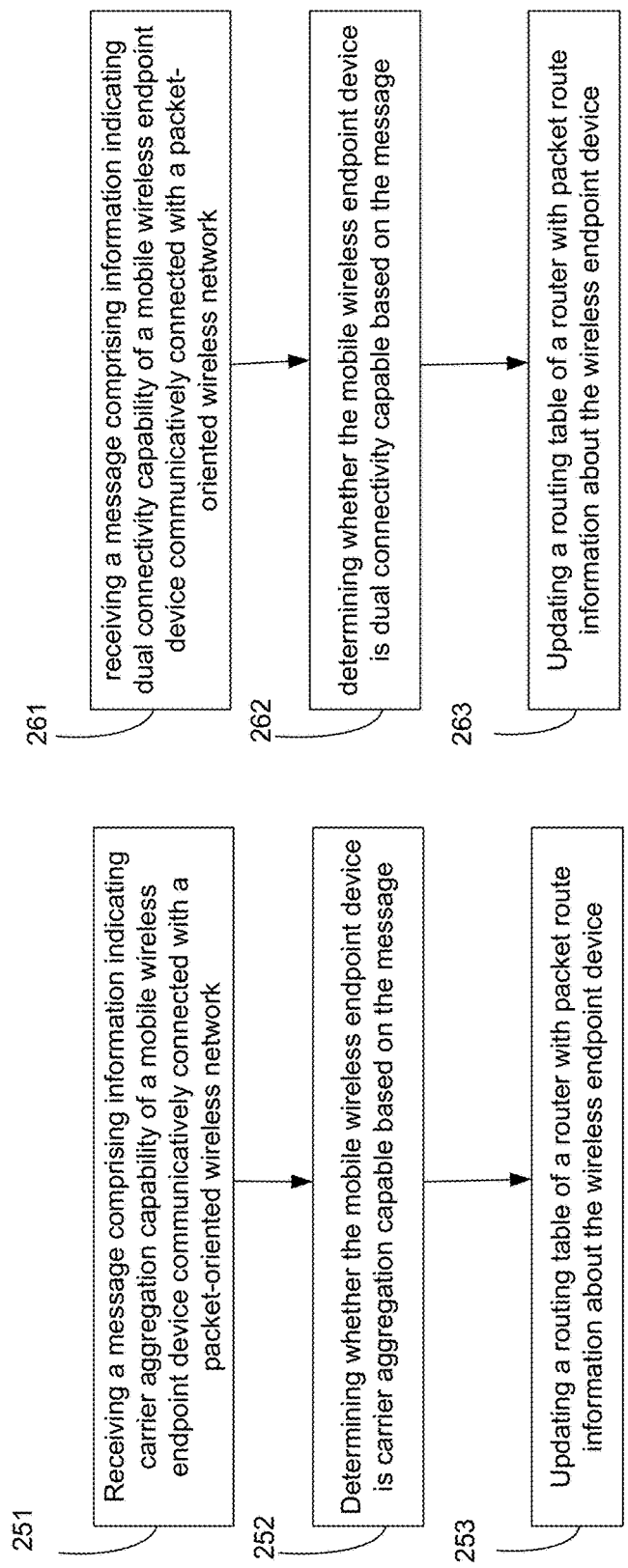
FIG. 10 illustrates an exemplary method for updating a routing table with regard to carrier aggregation in accordance with the present disclosure.
FIG. 11 illustrates an exemplary method for updating a routing table with regard to dual connectivity in accordance with the present disclosure.

FIG. 10 illustrates an exemplary method for updating a routing table with regard to carrier aggregation in accordance with the present disclosure. At step 251, there is receiving, by a processor, a message comprising information indicating carrier aggregation capability of a mobile wireless endpoint device communicatively connected with a packet-oriented wireless network. At step 252, there is determining, by the processor, whether the mobile wireless endpoint device is carrier aggregation capable based on the message. At step 253, based on the determining whether the mobile wireless endpoint device is carrier aggregation capable, updating, by the processor, a routing table of a router with packet route information about the wireless endpoint device, wherein the routing table comprises information regarding whether the wireless endpoint device is carrier aggregation capable.

FIG. 11 illustrates an exemplary method for updating a routing table with regard to dual connectivity in accordance with the present disclosure. At step 261, there is receiving, by a processor, a message comprising information indicating dual connectivity capability of a mobile wireless endpoint device communicatively connected with a packet-oriented wireless network. At step 262, there is determining, by the processor, whether the mobile wireless endpoint device is dual connectivity capable based on the message. At step 263, based on the determining whether the mobile wireless endpoint device is dual connectivity capable, updating, by the processor, a routing table of a router with packet route information about the wireless endpoint device, wherein the routing table comprises information regarding whether the wireless endpoint device is dual connectivity capable.

What is claimed:

1. A method for updating a routing table, the method comprising:
   receiving, by a processor, a message comprising information indicating carrier aggregation capability of a mobile wireless endpoint device communicatively connected with a packet-oriented wireless network;
   determining, by the processor, whether the mobile wireless endpoint device is carrier aggregation capable based on the message; and based on the determining whether the mobile wireless endpoint device is carrier aggregation capable, updating, by the processor, a routing table of a router with packet route information about the wireless endpoint device, wherein the routing table comprises information regarding whether the wireless endpoint device is carrier aggregation capable.

2. The method of claim 1, wherein packet route information comprises information on how to reach a session IP address for the wireless endpoint device in the packet-oriented wireless network.

3. The method of claim 1, wherein the message is an attachment message.

4. The method of claim 1, wherein updating of the packet route information for the wireless endpoint device is further based on whether the wireless endpoint device is authenticated by the processor.

5. The method of claim 1, wherein the packet route information in the packet-oriented wireless network comprises an indication to activate carrier aggregation for the wireless endpoint device.

6. The method of claim 1, wherein the packet route information in the packet-oriented wireless network comprises an indication to activate carrier aggregation for the wireless endpoint device based on a network load.

7. The method of claim 1, wherein the packet route information in the packet-oriented wireless network comprises an indication to activate carrier aggregation for the wireless endpoint device based on a memory load on a network device; and the operation further comprising sending, by the processor, a message with the packet route information to a router.

8. A method for updating a routing table, the method comprising:
receiving, by a processor, a message comprising information indicating dual connectivity capability of a mobile wireless endpoint device communicatively connected with a packet-oriented wireless network;
determining, by the processor, whether the mobile wireless endpoint device is dual connectivity capable based on the message; and
based on the determining whether the mobile wireless endpoint device is dual connectivity capable, updating, by the processor, a routing table of a router with packet route information about the wireless endpoint device, wherein the routing table comprises information regarding whether the wireless endpoint device is dual connectivity capable.

9. The method of claim 8, wherein the packet route information comprises information on how to reach a session IP address for the wireless endpoint device in the packet-oriented wireless network.

10. The method of claim 8, wherein the message is an attachment message.

11. The method of claim 8, wherein updating of packet route information about the wireless endpoint device is further based on whether the wireless endpoint device is authenticated by the processor; and the operation further comprising sending, by the processor, a message with the packet route information to a router.

12. The method of claim 8, wherein the packet route information in the packet-oriented wireless network comprises an indication to activate dual connectivity for the wireless endpoint device.

13. The method of claim 8, wherein the packet route information in the packet-oriented wireless network comprises an indication to activate dual connectivity for the wireless endpoint device based on a network load.

14. The method of claim 8, wherein the packet route information in the packet-oriented wireless network comprises an indication to activate dual connectivity for the wireless endpoint device based on a memory load on a network device.

15. A computer readable storage medium storing computer executable instructions that when executed by a computing device cause said computing device to effectuate operations comprising:
receiving a message comprising information indicating carrier aggregation capability of a mobile wireless endpoint device communicatively connected with a packet-oriented wireless network;
determining whether the mobile wireless endpoint device is carrier aggregation capable based on the message;
based on the determining whether the mobile wireless endpoint device is carrier aggregation capable, updating packet route information about the wireless endpoint device; and
sending a message with the route information to a router for updating a routing table of the router, wherein the route information comprises whether the wireless endpoint device is carrier aggregation capable.

16. The computer readable storage medium of claim 15, wherein the packet route information comprises information on how to reach a session IP address for the wireless endpoint device in the packet-oriented wireless network.

17. The computer readable storage medium of claim 15, wherein the message is an attachment message.

18. The computer readable storage medium of claim 15, wherein updating packet routing information for the wireless endpoint device is further based on whether the wireless endpoint device is authenticated by the processor.

19. The computer readable storage medium of claim 15, wherein the packet route information in the packet-oriented wireless network comprises an indication to activate carrier aggregation for the wireless endpoint device.

20. The computer readable storage medium of claim 15, wherein the packet route information in the packet-oriented wireless network comprises an indication to activate carrier aggregation for the wireless endpoint device based on a network load.

* * * * *